US006372126B1

(12) United States Patent
Reeves

(10) Patent No.: US 6,372,126 B1
(45) Date of Patent: Apr. 16, 2002

(54) CHLORINATOR FOR AEROBIC WASTE TREATMENT SYSTEMS

(76) Inventor: Gary R. Reeves, 23890 Melanie La., Hockley, TX (US) 77447

( * ) Notice: Subject to any disclaimer, the term of this patent is extended or adjusted under 35 U.S.C. 154(b) by 0 days.

(21) Appl. No.: 09/632,720

(22) Filed: Aug. 4, 2000

Related U.S. Application Data

(63) Continuation-in-part of application No. 09/507,281, filed on Feb. 18, 2000, which is a continuation-in-part of application No. 09/357,068, filed on Jul. 19, 1999, now Pat. No. 6,183,630.

(51) Int. Cl.[7] .............................................. B01D 17/12
(52) U.S. Cl. ....................... 210/91; 137/268; 210/121; 210/169; 210/198.1; 422/264; 422/277
(58) Field of Search ........................... 210/85, 91, 121, 210/169, 198.1, 232, 532.1; 422/264, 274–279, 282; 137/268

(56) References Cited

U.S. PATENT DOCUMENTS

| | | | | |
|---|---|---|---|---|
| 3,411,981 A | * | 11/1968 | Thomas | |
| 3,474,817 A | * | 10/1969 | Bates et al. ................. | 210/169 |
| 4,100,073 A | * | 7/1978 | Hopcraft ................... | 210/532.1 |
| 4,210,627 A | * | 7/1980 | Price ........................ | 422/264 |
| 4,584,106 A | * | 4/1986 | Held .......................... | 137/268 |
| 4,759,907 A | * | 7/1988 | Kawolics et al. ........... | 422/278 |
| 4,842,729 A | * | 6/1989 | Buchan .................... | 210/198.1 |
| 4,917,868 A | * | 4/1990 | Alexander et al. .......... | 422/264 |
| 5,089,127 A | * | 2/1992 | Junker et al. ................ | 422/264 |
| 5,207,896 A | * | 5/1993 | Graves ..................... | 210/532.1 |
| 5,350,512 A | * | 9/1994 | Tang .......................... | 422/264 |
| 5,405,540 A | * | 4/1995 | Tang .......................... | 210/754 |
| 5,441,711 A | * | 8/1995 | Drewery ..................... | 422/264 |
| 5,885,446 A | * | 3/1999 | McGrew ....................... | 210/91 |
| 5,932,093 A | * | 8/1999 | Chulick ..................... | 210/169 |
| 6,066,252 A | * | 5/2000 | Reeves ......................... | 210/91 |
| 6,077,484 A | * | 6/2000 | Graves ....................... | 422/277 |
| 6,138,703 A | * | 10/2000 | Ferguson et al. ........... | 137/268 |
| 6,183,630 B1 | * | 2/2001 | Reeves .................... | 210/198.1 |

* cited by examiner

Primary Examiner—Joseph Drodge
(74) Attorney, Agent, or Firm—Keeling Law Firm

(57) ABSTRACT

A chlorinator for aerobic waste treatment systems that is in functional attachment with a waste stream and that includes a plurality of chlorine tablets therein. The chlorinator includes a cylinder portion that has a plurality of openings therethrough providing fluid communication between the waste stream and the plurality of chlorine tablets so that the waste stream comes into contact with all surfaces of at least one of the chlorine tablets. The chlorinator includes a cylinder portion adapted to hold the chlorine tablets therein, the cylinder portion having a plurality of openings providing fluid communication between the waste stream and chlorine tablets and a cylinder floor. The cylinder floor includes a floor aperture. In one embodiment there is a support disk hinged and oriented over the floor aperture so as to cover the floor aperture and a device to sense the presence of chlorine tablets within the cylinder portion. In another embodiment a float is oriented below and through the floor aperture functionally attached to a device for sensing the presence of chlorine tablets within the cylinder portion.

22 Claims, 9 Drawing Sheets

CHLORINATOR FOR AEROBIC WASTE TREATMENT SYSTEMS

This is a continuation-in-part application under 37 CFR 1.53(b) to application Ser. No. 09/507,281, filed on Feb. 18, 2000 by Gary R. Reeves, which is a continuation-in-part application under 37 CFR 1.53(b) to application Ser. No. 09/357,068, "Chlorinator For Aerobic Waste Treatment Systems," filed on Jul. 19, 1999, now U.S. Pat. No. 6,183,630 by Gary R. Reeves.

BACKGROUND OF THE INVENTION

1. Field of Invention

This invention is generally aimed at chlorinators. More specifically, this invention is a chlorinator for fluid in an aerobic waste treatment system, swimming pool, or similar system having a contained flowing fluid requiring chlorination. The invention allows the associated fluid flow to contact all sides of at least one of the chlorine tablets held by the chlorinator, that includes a chlorine supply mechanism which ensures that the chlorine tablets slide and do not become lodged therein even after substantial use. The chlorinator has a sensor that detects and activates an alarm when the chlorine supply reaches below a pre-determined level.

2. Related Art

Chlorinators are known to the prior art. Illustrative of such chlorinators are U.S. Pat. No. 4,100,073 issued to Hopcroft on Jul. 11, 1978; U.S. Pat. No. 4,210,624 issued to Price on Jul. 1, 1980; U.S. Pat. No. 4,584,106 issued to Held on Apr. 22, 1986; U.S. Pat. No. 5,207,896 issued to Graves on May 4, 1993; U.S. Pat. No. 5,350,512 issued to Tang on Sep. 27, 1994; and U.S. Pat. No. 5,405,540 issued to Tang on Apr. 11, 1995.

Typical prior art chlorinators include a cylinder portion that holds a plurality of chlorine tablets. Normnally, the lowermost chlorine tablet is the chlorine tablet that primarily actively treats the wastewater. The lowermost tablet usually rests on the lowermost end of the cylinder portion, which lowermost end typically has no openings therethrough. Because the lowermost end of the cylinder portion of a prior art chlorinator typically has no openings therethrough, the lowermnost tablet does not come into contact with the water flow on its underside, namely the surface of the chlorine tablet that abuts the lowermost end of the cylinder portion. The treatment and chlorination of the water flow would be enhanced and increased if the water flow would come into contact with all sides of at least one of the chlorine tablets, namely the lowermost chlorine tablet. Therefore, it would be beneficial to the prior art to provide a chlorinator that allows the associated water flow to contact all sides of at least one of the chlorine tablets held by the chlorinator.

In many prior art chlorinators, the chlorine tablets become lodged to the inside surface of the cylinder portion, preventing the proper operation of the chlorinator. It is important that the chlorine tablets slide and do not stick inside the cylinder portion of the chlorinator. This is important not only when the chlorine tablets are initially inserted, but also as the lowermost tablet dissolves allowing the other tablets to slide down by gravity towards the lowermost end of the cylinder portion. The prior art would therefore benefit from a chlorinator that includes a mechanism that ensures that the chlorine tablets slide and do not get stuck to the inside surface of the cylinder portion even after substantial use. It would be further beneficial to the prior art if such mechanism does not react with the chlorine tablets thereby enabling the chlorine tablets to retain their relevant treatment properties.

Prior art chlorinators for wastewater treatment typically also treat all of the waste that flows through the attached waste stream. However, under current laws and regulations, not all of the waste flowing through waste streams needs to be chlorinated. Generally speaking, the waste transported within waste streams typically comprises septic wastewater and gray wastewater. Septic wastewater is defined as waste that originates from toilet systems and as a result of toilet flushes. Gray wastewater comprises all other wastes originating somewhere other than from toilet systems. Under current laws and regulations, only septic wastewater needs to be treated by a chlorinator and chlorine tablets. Therefore, in order to conserve resources and increase the life of the chlorine tablets, it would be beneficial to the prior art to provide a chlorinator that is selective as to which type of wastewater is chlorinated. Furthermore, the prior art would benefit from a chlorinator that selectively treats septic wastewater but does not treat gray wastewater.

It would further be an improvement of the prior art for the chlorinator to provide a simple and reliable device for detection of low chlorine tablet levels. An additional improvement would be the diversion of water or wastewater being treated either through the physical structure of the chlorinator, or with a system of bypass fluid lines.

BRIEF SUMMARY OF THE INVENTION

Accordingly, the objects of my invention is to provide, inter alia, a chlorinator for liquid fluid treatment systems that:

- allows the associated fluid flow to contact the sides of at least one of the chlorine tablets held by the chlorinator;
- includes a sensor for detecting when the chlorine supply drops below a pre-determined level, thus activating an alarm upon such detection;
- includes a mechanism which ensures that the chlorine tablets slide and do not get lodged to the inside surface of the cylinder portion even after substantial use;
- includes a mechanism that does not react with the chlorine tablets thereby enabling the chlorine tablets to retain their relevant treatment properties;
- selectively directs the amount of water treated in a swimming pool or like water application;
- is selective as to which type of wastewater is chlorinated in an aerobic wastewater treatment system; and
- selectively treats septic wastewater but does not treat gray wastewater.

Other objects of my invention will become evident throughout the reading of this application.

My invention is a chlorinator, for water (e.g. as for a swimming pool) or wastewater (e.g. as for an aerobic waste treatment systems), that is in functional attachment with a fluid stream and that includes a plurality of chlorine tablets therein. The chlorinator includes a cylinder portion that has a plurality of openings therethrough providing fluid communication between the fluid stream and the plurality of chlorine tablets so that the fluid stream comes into contact with all surfaces of at least one of the chlorine tablets. The cylinder portion of the chlorinator also includes an inner surface that has a coating that is non-reactive with the chlorine tablets and that enables the chlorine tablets to slide thereon. Alternatively, the entire thickness of the cylinder portion is made of a non-reactive non-stick material, such as polyethylene.

For wastewater treatment, the waste stream comprises septic wastewater, which originates from toilet systems, and gray wastewater, which originates from somewhere other than toilet systems. The chlorinator also includes a means for selectively treating the septic wastewater with the chlorine tablets and not treating the gray wastewater with the chlorine tablets. In the preferred embodiment, means for selectively treating comprises a passageway that provides fluid communication between the upstream side of the waste stream and the base portion of the chlorinator without directing any of the relevant fluid through the cylinder portion.

For treatment of water such as for a swimming pool, the structure may be altered such that all water passing through the inventive device is treated by chlorination, with the amount of water passing through being controlled by a by-pass valve and by-pass line. Alternatively, the structure may be the same as that used in the preferred embodiment for treatment wastewater, such that a pre-determined flow rate allows some of the water to pass across the chlorine tablets, while the rest drops below the tablets in a manner analogous to the graywater described in the treatment of wastewater.

BRIEF DESCRIPTION OF THE DRAWINGS

Similar reference characters denote corresponding features consistently throughout the figures.

DETAILED DESCRIPTION OF THE INVENTION

Figure 1:
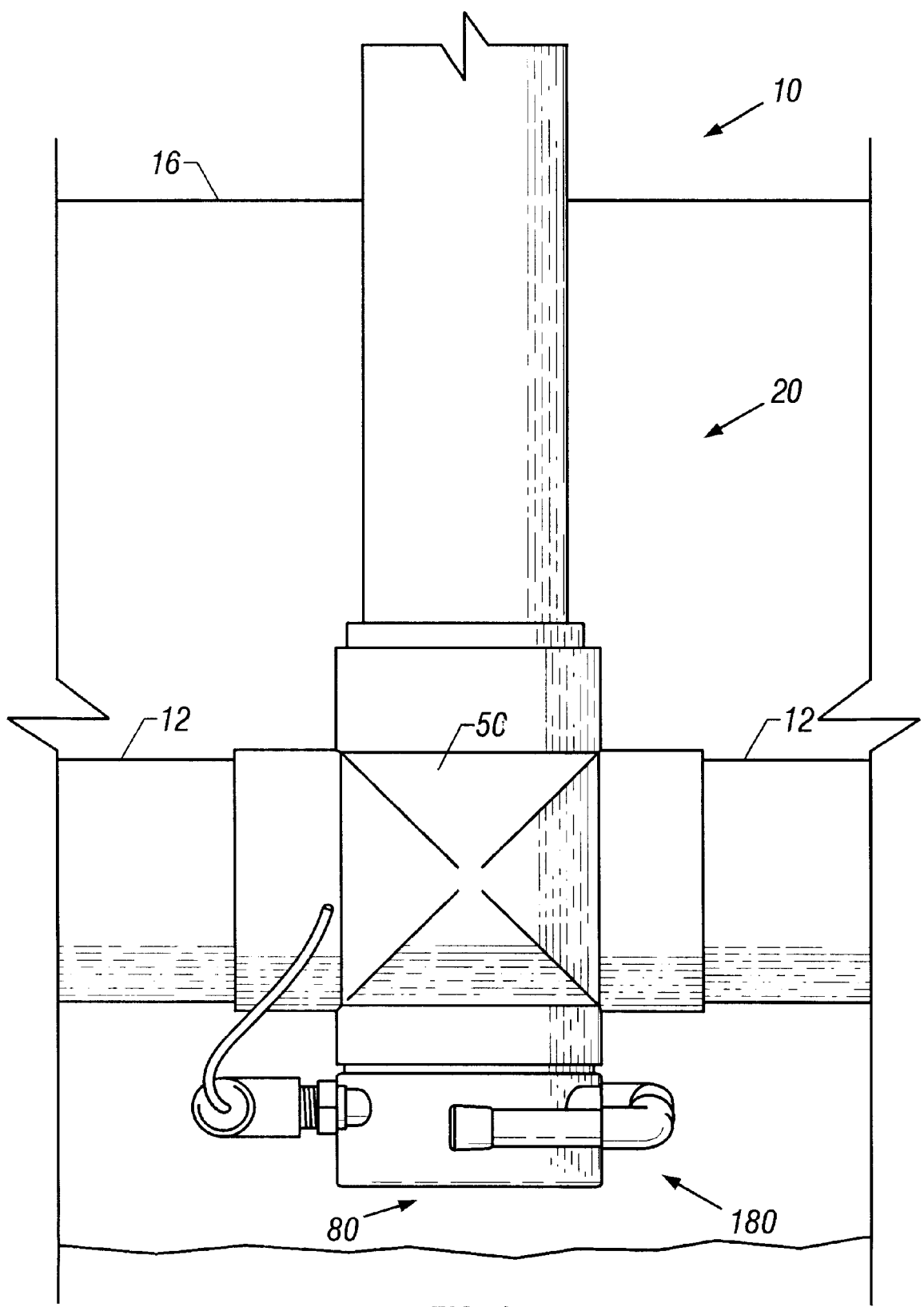
FIG. 1 is an elevational view of the chlorinator buried in the ground and functionally attached to a waste stream.

The Chlorinator 10 is shown in FIGS. 1–10. When used in the treatment of wastewater, chlorinator 10 is in functional attachment with a waste stream 12 and, while in use, typically includes a plurality of chlorine tablets 14 therein. Waste stream 12 includes an upstream side, from where the relevant fluid enters chlorinator 10, and a downstream side, from where the relevant fluid exits chlorinator 10. Typically, chlorinator 10 is suspended within a pump tank, and waste stream 12 comprises septic wastewater as well as gray wastewater. Septic wastewater is defined as waste that originates from toilet systems. Gray wastewater comprises all other wastes originating somewhere other than from toilet systems. Generally and in the preferred embodiment, chlorinator 10 includes a cylinder portion 20 and a base portion 80. Preferably, chlorinator 10 also includes a means for selectively treating 140 the septic wastewater with the chlorine tablets 14 and not treating the gray wastewater with the chlorine tablets 14.

In the preferred embodiment, cylinder portion 20 includes a first end 22, a second end 24, an outer surface 26, and an inner surface 28. First and second ends, 22 and 24, correspond to the circular ends of the generally cylindrical shape. First end 22 is proximate or above ground level 16. Second end 24 is distal to or below ground level 16. Cylinder portion 20 is hollow thereby defining an open interior 30. Chlorine tablets 14 are held within cylinder portion interior 30. Cylinder portion 20 further includes a longitudinal axis 29 running axially lengthwise through cylinder portion 20.

Cylinder portion 20 includes a plurality of openings 32 that provide fluid communication between the waste stream 12 and the cylinder portion interior 30. In the preferred embodiment, the openings 32 provide fluid communication as previously stated so that waste stream 12 comes into contact with all surfaces of at least one chlorine tablet 14 held within cylinder portion interior 30. Also preferably, the openings 32 are proximate cylinder portion second end 24.

Preferably, plurality of openings 32 comprises a plurality of passages 34 and a plurality of holes 36. Passages 34 are defined on cylinder portion second end 24 thereby allowing fluid communication therethrough between cylinder portion interior 30 and the exterior of cylinder portion 20. Holes 36 are defined on cylinder portion outer surface 26 proximate cylinder portion second end 24 thereby allowing fluid communication therethrough between cylinder portion interior 30 and the exterior of cylinder portion 20. In the preferred embodiment, passages 34 comprise a plurality of slits 38 defined on cylinder portion second end 24. In the preferred embodiment, holes 36 comprise a plurality of holes equally spaced about cylinder portion longitudinal axis 29.

In the preferred embodiment, cylinder portion inner surface 28 includes a coating 40 that is non-reactive to the chlorine tablets 14 and that creates a slippery surface for the chlorine tablets 14 so that the chlorine tablets 14 slide thereon. Thereby, coating 40 prevents the chlorine tablets 14 from sticking to the cylinder portion inner surface 28 as the higher tablets 14 gravitate downward within cylinder portion 20. In the preferred embodiment, coating 40 comprises a coating layer of polyurethane.

In an alternative preferred embodiment, cylinder portion 20 is made entirely of polyurethane or a similar rigid material with low friction that is non-reactive to the chorine tablets 14. The entire length of cylinder portion 20 may be made of such material, or only the lower portion may be of such material.

Chlorinator 10 preferably comprises a 4-way joint portion 50 intermediate cylinder portion 20 and base portion 80. Joint portion 50 includes four inlets 52, each leading to a central interior region 54. In the preferred embodiment, the four inlets 52 comprise two sets of opposing inlets 52. In general, cylinder portion 20 and base portion 80 are attached to two opposing inlets 52, and waste stream 12 is attached to the remaining two opposing inlets 52.

The attachment of cylinder portion 20 to its inlet 52 is preferably a sliding frictional attachment. The frictional fit between cylinder portion 20 and its inlet 52 is preferably aided by the addition of an annular filler 56. Annular filler 56 is attached to the cylinder portion outer surface 26 in one embodiment and to the inlet 52 in another embodiment.

The attachment of base portion 80 to its inlet 52 is preferably also a sliding frictional attachment. In the preferred embodiment, base portion 80 comprises a base cap 82 and an annular coupling 84. Essentially, the respective inlet 52 is slidingly frictionally attached to one end of annular coupling 84, and base cap 82 is slidingly frictionally attached to the other end of annular coupling 84.

The attachment of waste stream 12 to its two inlets 52 can be one of any number of types known in the prior art. For purposes of ease of installation and removability, the attachment is preferably also a sliding frictional fit. Preferably, the waste stream 12 is slidingly frictionally attached to each of the relevant two opposing inlets 52.

Figure 5:
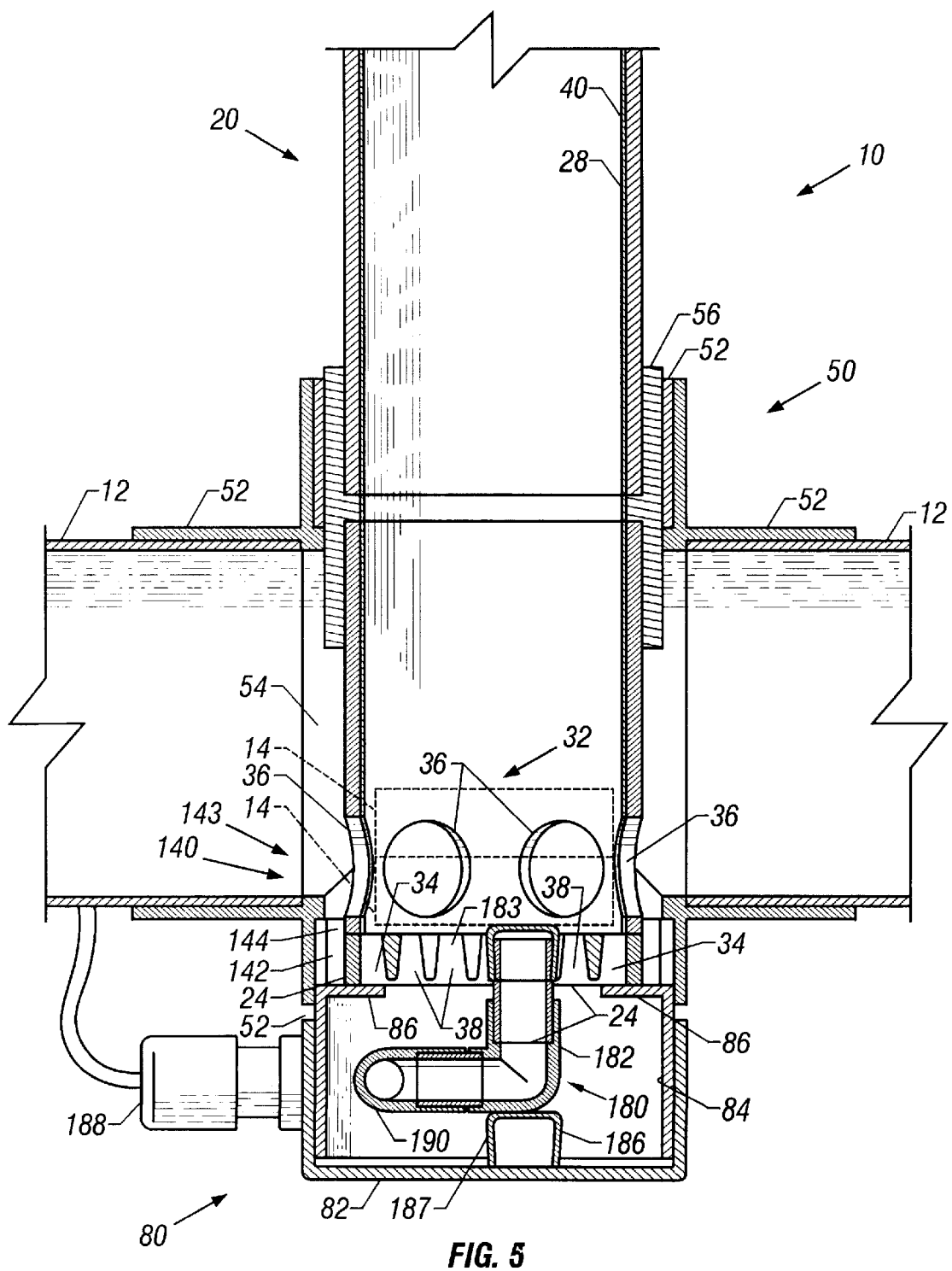
FIG. 5 is a cross-sectional view of the chlorinator functionally attached to a waste stream.

As best shown in FIG. 5, the attachment of cylinder portion 20 to its inlet 52 is such that the holes 36 are situated within central interior region 54 proximate base portion 80. In addition, the attachment of cylinder portion 20 to its inlet 52 is such that cylinder portion second end 24 rests on a plurality of base portion tabs 86. Base portion tabs 86 are inwardly pointed tabs defined from annular coupling 84. Therefore, in the preferred embodiment, cylinder portion 20 and all other relevant items are constructed so that the holes 36 are situated within central interior region 54 when cylinder portion second end 24 rests on tabs 86.

Means for selectively treating 140 selectively treats the septic wastewater with the chlorine tablets 14 and does not treat the gray wastewater with the chlorine tablets 14. In the preferred embodiment, means for selectively treating 140 comprises a passageway 142 that provides fluid communication between the upstream side of waste stream 12 and base portion 80 without directing any of the relevant fluid through cylinder portion 20. In the preferred embodiment, passageway 142 comprises an annular space 144. In this embodiment, cylinder portion 20 is constructed so that annular space 144 is defined between cylinder portion outer surface 26 adjacent cylinder portion second end 24 and the inlet 52 corresponding to base portion 80. Therefore, the outer cross-sectional diameter of cylinder portion 20 adjacent cylinder portion second end 24 is smaller than the inner cross-sectional diameter of the inlet 52 corresponding to base portion 80.

While chlorinator 10 has been described above in the treatment of wastewater, it can also be used to treat water, such as in a swimming pool, fountain, water system or similar water treatment system. The fluid/tablet contact is analogous to that described above.

Chlorinator 10 may also include a means for sensing 180 the presence of chlorine tablets 14 within cylinder portion 20. In the preferred embodiment, means for sensing 180 comprises a sensor 188 pivotally attached to base portion 80. Sensor 188 senses when its pivotal movement has passed a certain predetermined point which indicates that chlorine tablets 14 have been dissolved. Preferably, means for sensing 180 comprises a prong 182, a forward stop 184, and sensor 188 pivotally attached to base portion 80, preferably to base cap 82. In the preferred embodiment, means for sensing 180 also comprises a backward stop 186.

Figure 2:
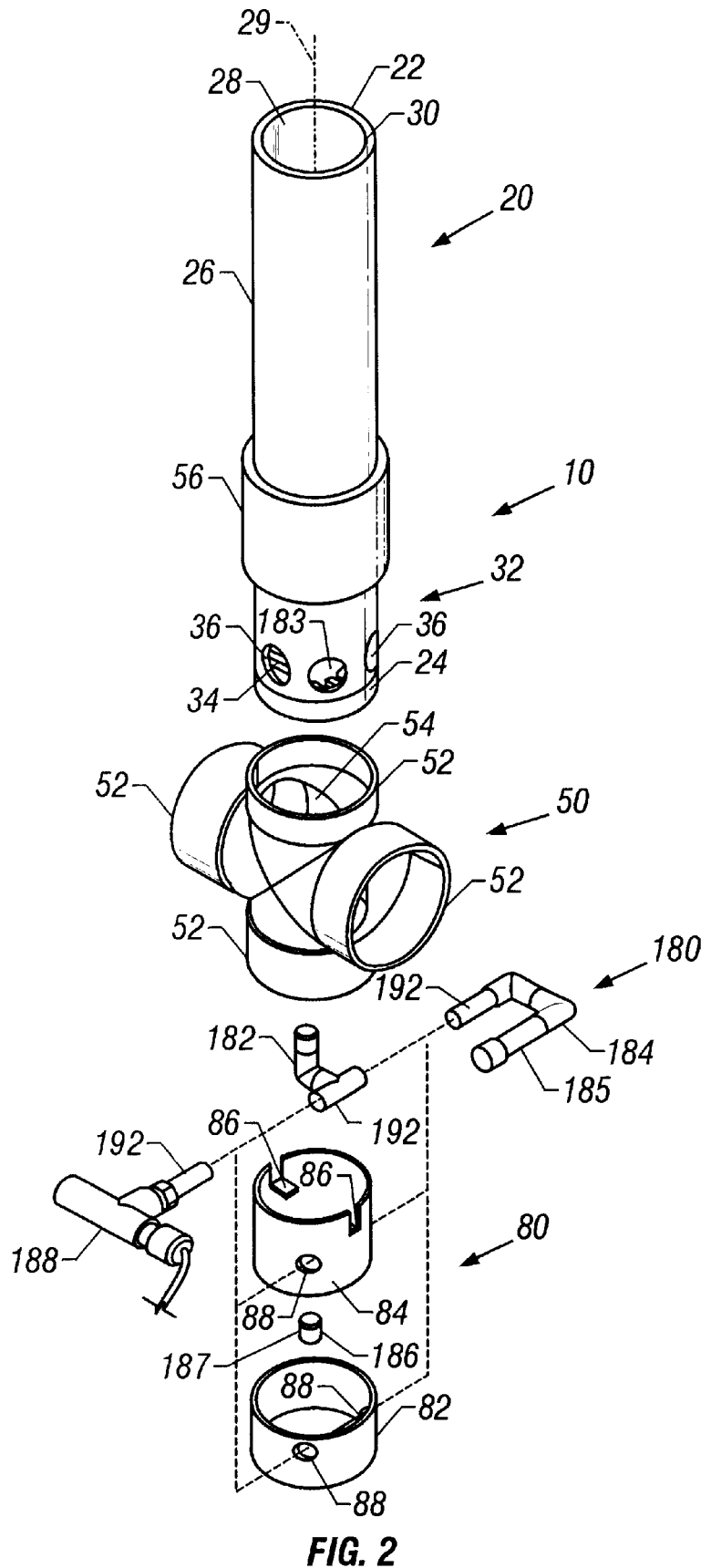
FIG. 2 is an exploded isometric view of the chlorinator.
Figure 3:
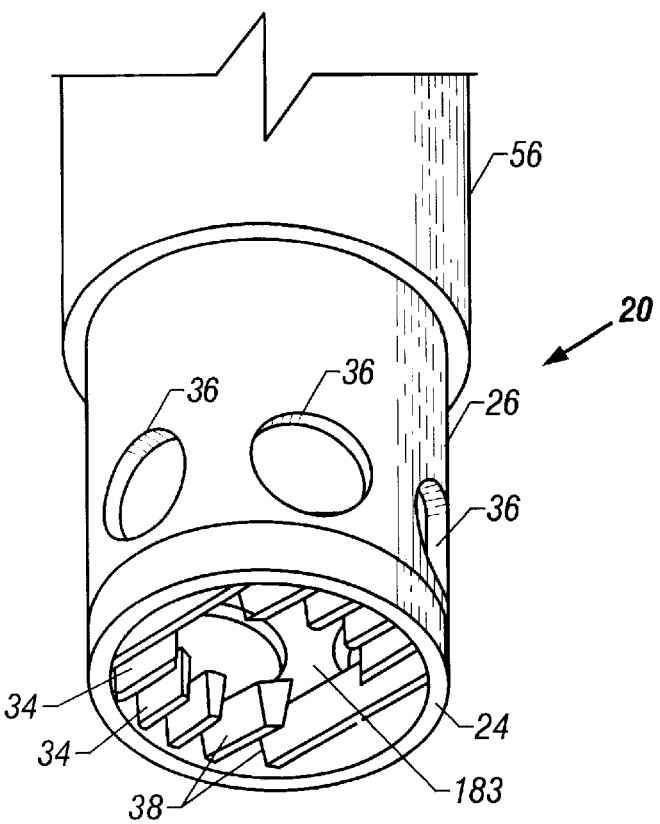
FIG. 3 is an isometric view of the second end of the cylinder portion.
Figure 4:
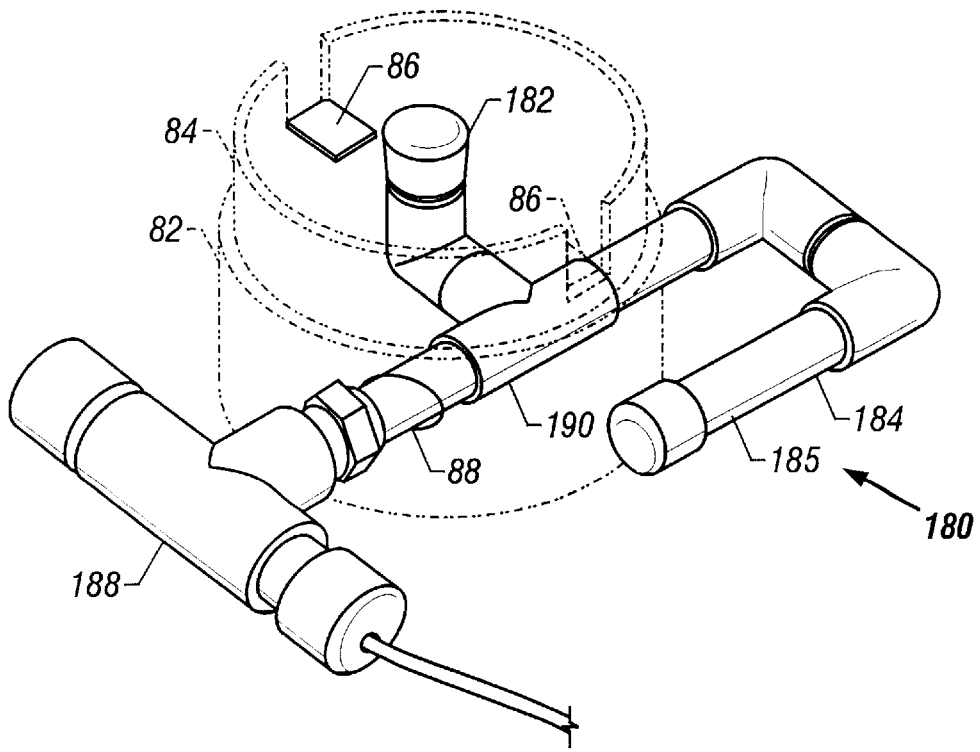
FIG. 4 is an isometric view of the means for sensing with the attached base portion in phantom lines.

Prong 182 is preferably a vertical member directly underneath cylinder portion second end 24. In fact, the top end of prong 182 preferably protrudes into cylinder portion second end 24 through a cylinder portion second end hole 183, which itself is preferably axially aligned in relation to cylinder portion second end 24. Prong 182 is pivotally attached to base portion 80 by way of a pivoting arm 190 which extends through at least one but preferably a plurality of holes 88 on base portion 80 (either only on base cap 82 or on both base cap 82 and annular coupling 84, depending on the embodiment). In the preferred embodiment, holes 88 are slightly oversized in relation to pivoting arm 190 so as to allow fluid communication therethrough when pivoting arm 190 is situated therein. As best seen in FIG. 2, pivoting arm 190 can be comprised from a plurality of connectable appendages 192.

Forward stop 184 is attached to one side of pivoting arm 190 exterior of base portion 80. Forward stop 184 prevents prong 182 from pivoting forward, or vertically upward, past a certain point. In the preferred embodiment, forward stop 184 comprises a stop arm 185 that extends from one side of pivoting arm 190 exterior of base portion 80 back in the direction of longitudinal axis 29 on the side of pivoting arm 190 opposite prong 182. Thus, at a certain point during the forward, or vertically upwards, pivoting motion of prong 182, stop arm 185 will contact base portion 80 thereby stopping any further pivoting motion.

Sensor 188 is preferably attached to the side of pivoting arm 190 opposite forward stop 184, preferably also exterior to base portion 80. Sensor 188 senses when prong 182 has pivoted forward, or vertically upwards, past a certain point, at which point sensor 188 transmits a signal to a user indicating such occurrence. In the preferred embodiment, sensor 188 comprises a mercury switch (not shown) that senses rotational movement in the pivoting arm 190.

Backward stop 186 is preferably attached to the interior of base cap 82 directly underneath prong 182. Backward stop 186 prevents prong 182 from pivoting backward, or vertically downward, past a certain point. In the preferred embodiment, backward stop 186 comprises a stop knob 187. Stop knob 187 is preferably attached to the interior of base cap 82 and is axially aligned therewith. Thus, at a certain point during the backward, or vertically downwards, pivoting motion of prong 182, the bottom end of prong 182 will contact stop knob 187 thereby stopping any further pivoting motion. In addition, stop knob 187 and prong 182 are preferably sized and constructed so that when prong 182 rests on stop knob 187 the top end of prong 182 protrudes into cylinder portion second end 24 through cylinder portion second end hole 183.

Figure 6:
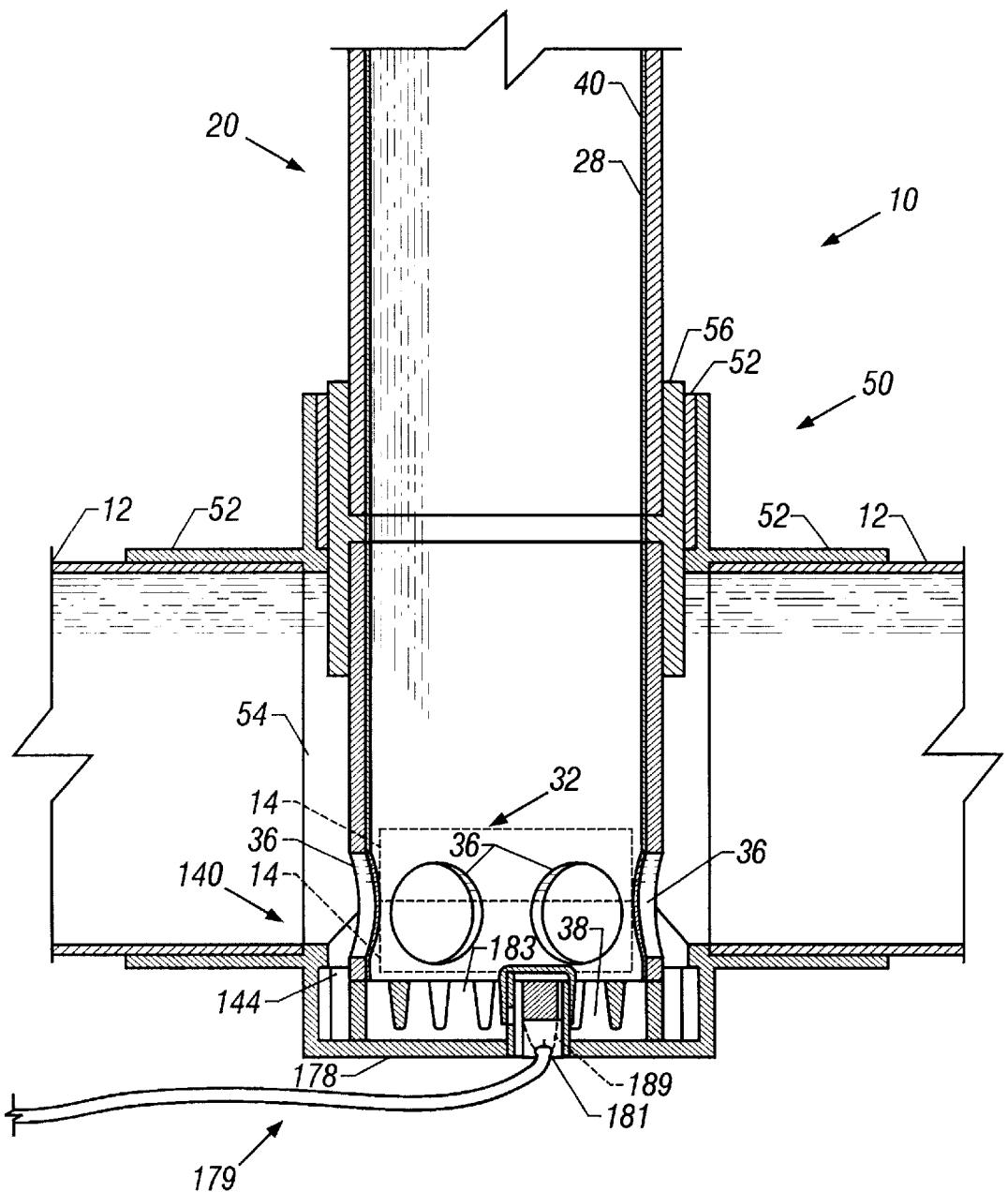
FIG. 6 is a cross-sectional view of the second preferred embodiment of the invention, utilizing a push-button chlorine tablet support and sensor.

An alternate preferred embodiment for means of sensing 180 is shown in FIG. 6. Proximate base 178 performs a similar function to that of base portion 80 described above. However, proximate base 178 may shorter than base portion 80 due to the lack of pivoting arm 190 and associated structures to pivoting arm 190. Proximate base 178 still retains adequate depth to allow runoff of gray wastewater flow as described below, having a means of flow opening (not shown in FIG. 6) analogous to that described below using oversized holes 88. Proximate base 178 houses push button sensor 181, which protrudes slightly into cylinder portion second end 24. Push button sensor 181 is waterproof to protect its internal electrical components, and has sufficient lateral strength to resist water flow against it, including when not weighted by chlorine tablet 14.

Push button sensor 181 supports the stacked chlorine tablets 14. As each subsequent lowermost chlorine tablet 14 dissolves as described below, the cumulative weight of stacked chlorine tablets 14 is reduced. Initially, spring 189 provides a counter-force against the stack of chlorine tablets 14, such that the internal contact switch of push button sensor 181 is activated (either engaged or disengaged, depending on the electronic circuitry logic chosen). When the stack of chlorine tablets 14 are reduced to a predetermined level, spring 189 pushes upward to activate push button sensor 181. This predetermined level may be when all chlorine tablets 14 are dissolved, or any other desired number or partial number of chlorine tablets 14 is remaining. When push button sensor 181 is activated, a signal (typically electrical) is sent to a low-chlorine alarm (not shown), either local or remote.

While push button sensor 181 is described and defined as a spring loaded electrical push button, it is understood that push button sensor 181 can be any electrical contact device capable of supporting chlorine tablet 14 or stacked chlorine tablets 14, and initiating an electrical circuit (opening or closing a resident switch) or similar signal when chlorine tablets 14 drop below a pre-determined quantity or amount. Thus push button sensor 181 may by a leaf spring switch, counterweight switch, or any other similar switch capable of operation within the interior of chlorinator 10.

Figure 7:
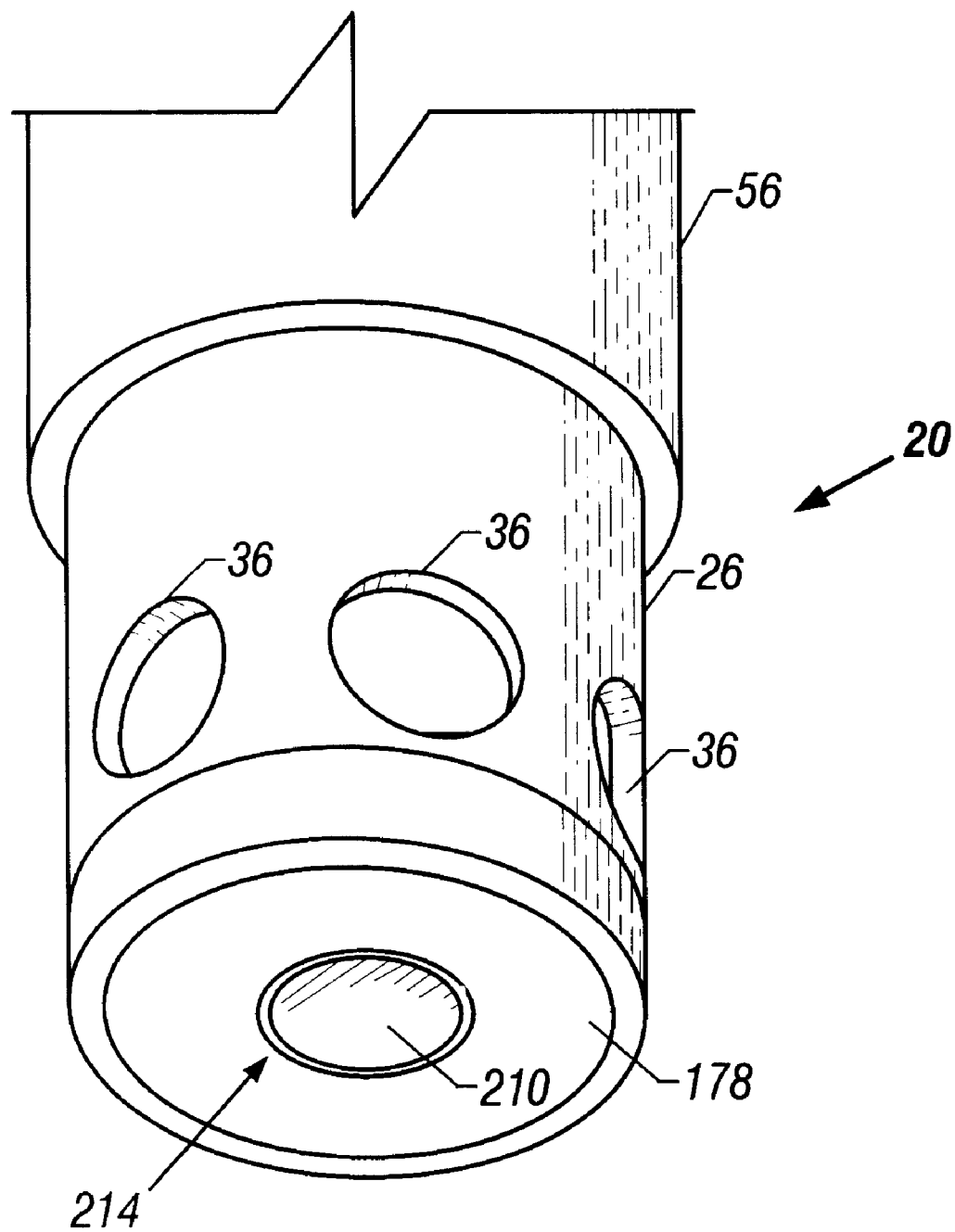
FIG. 7 is an isometric view of the bottom of a chlorine tablet cylinder holder in a third alternate preferred embodiment having a tablet support disk covering an aperture in the base.
Figure 8:
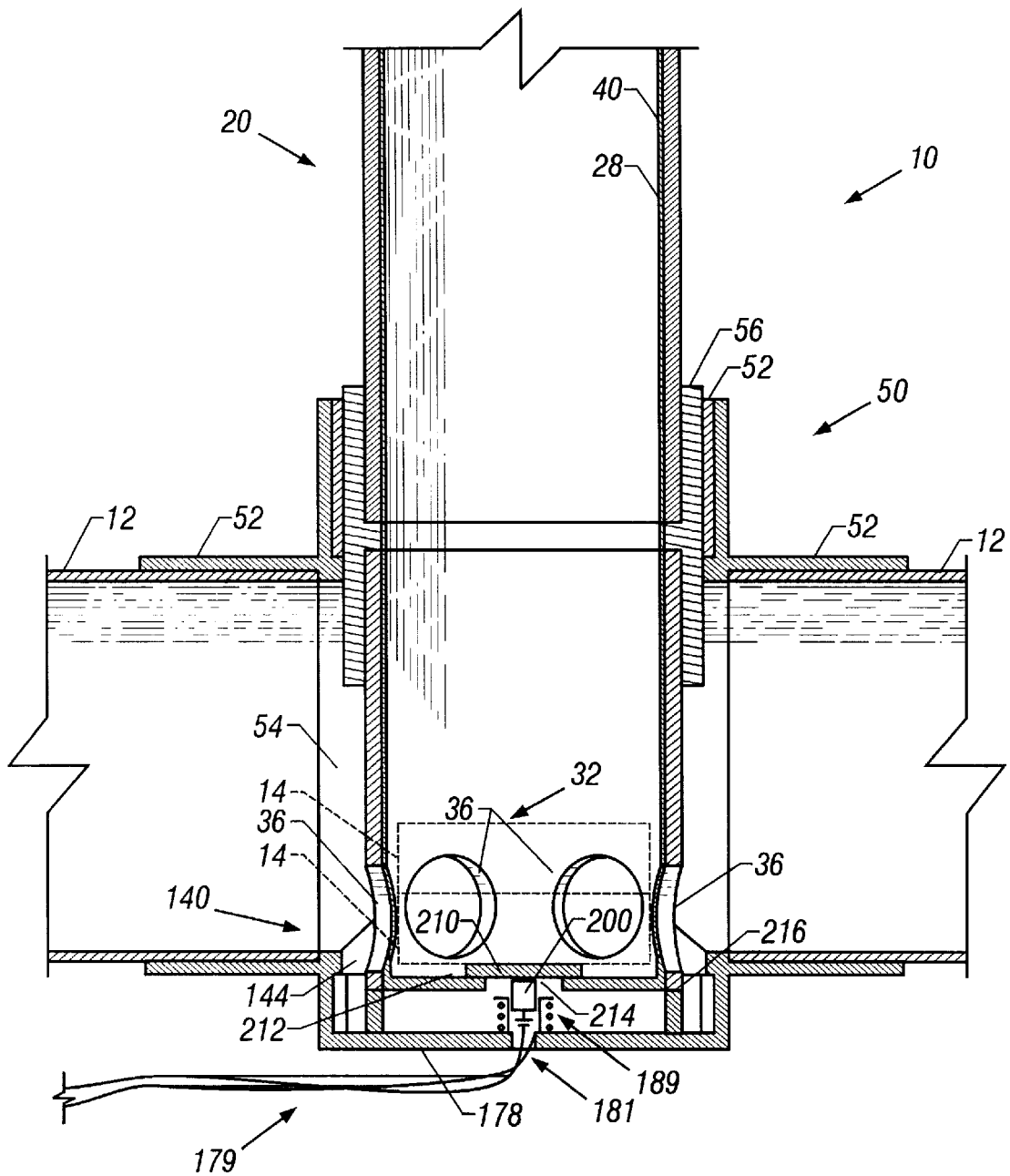
FIG. 8 is a cross-sectional view of the third alternate preferred embodiment showing a push-button tablet sensor proximate a chlorine tablet support disk.

A third alternate preferred embodiment is depicted in FIG. 7 and FIG. 8. This embodiment comprises push button sensor 181 as in the embodiment depicted in FIG. 6. To minimize crumbling and breaking apart, chlorine tablets 14 stack such that the lowest chlorine tablet 14 rests flat on top of support disk 210. In this embodiment, opening 32 allowing fluid to pass through the lower portion of cylinder portion interior 30 is comprised primarily of plurality of holes 36. Support disk 210 is typically a plastic disk, and preferably has a slightly greater diameter than the diameter of cylinder floor aperture 214, which traverses through cylinder floor 216. Support disk 210 is mechanically connected, preferably with support disk hinge 212, to the interior surface of cylinder floor 216, and oriented over cylinder floor aperture 214 such that cylinder floor aperture 214 is occluded, thus minimizing water flow and eddy currents between cylinder floor 216 and proximate base 178. Immediately below and abutting support disk 210 is push button 200 of push button sensor 181, which is typically mounted to and supported by proximate base 178.

Chlorine tablet(s) 14 rest on support disk 210, thus pushing down on push button 210, closing (or opening) the switch in push button sensor 181. When the last or other predetermined count or weight of chlorine tablet 14 dissolves, push button 200 is pushed upward by spring 189, which is oriented axially around and below push button 200. This upward movement of push button 200 opens (or closes) the switch in push button sensor 181, sending a signal via signal wires 179 indicating the low chlorine level.

Figure 9:
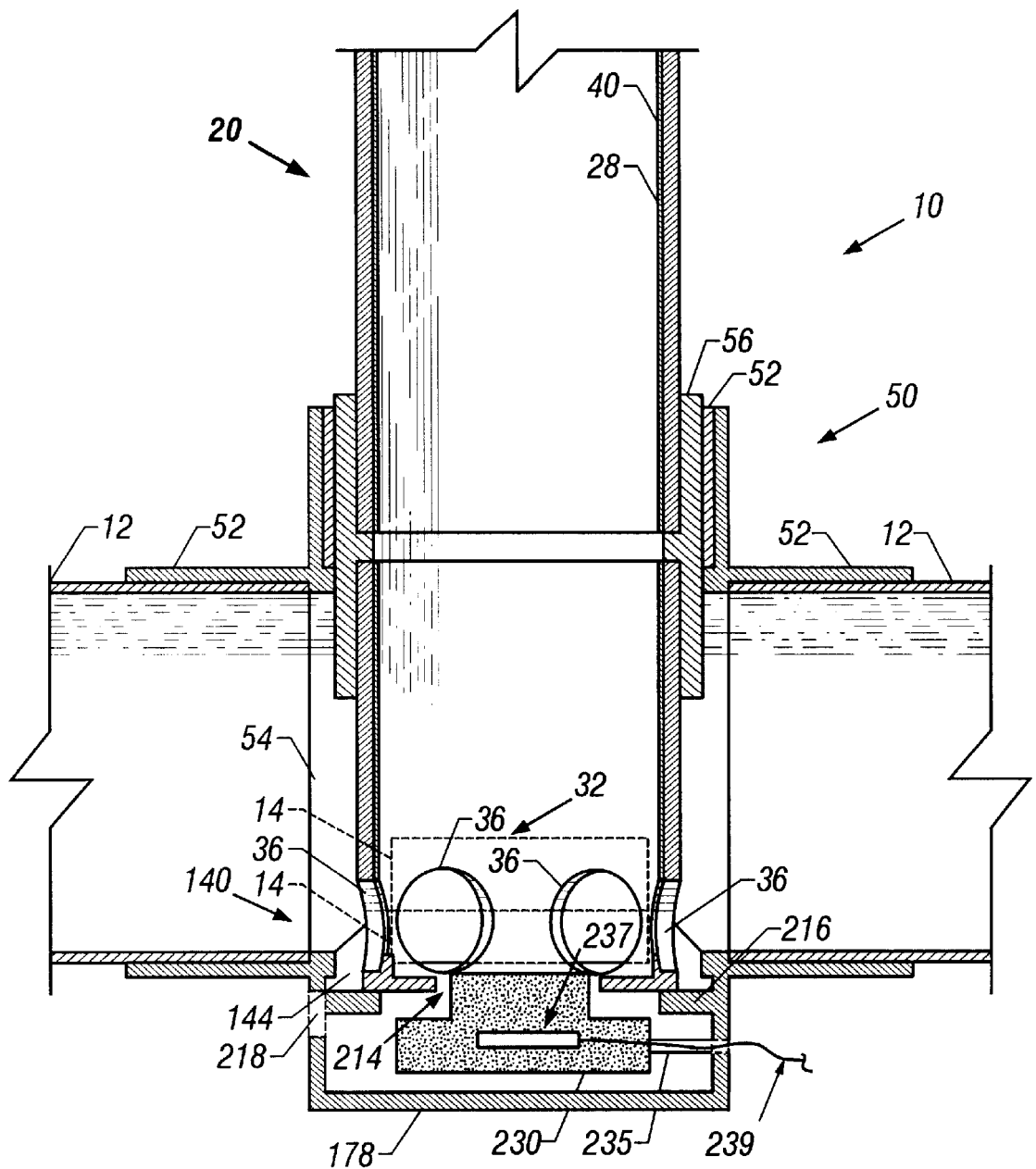
FIG. 9 is a cross-sectional view of a fourth alternate preferred embodiment using a float sensor, said sensor shown held down by the weight of chlorine tablets.
Figure 10:
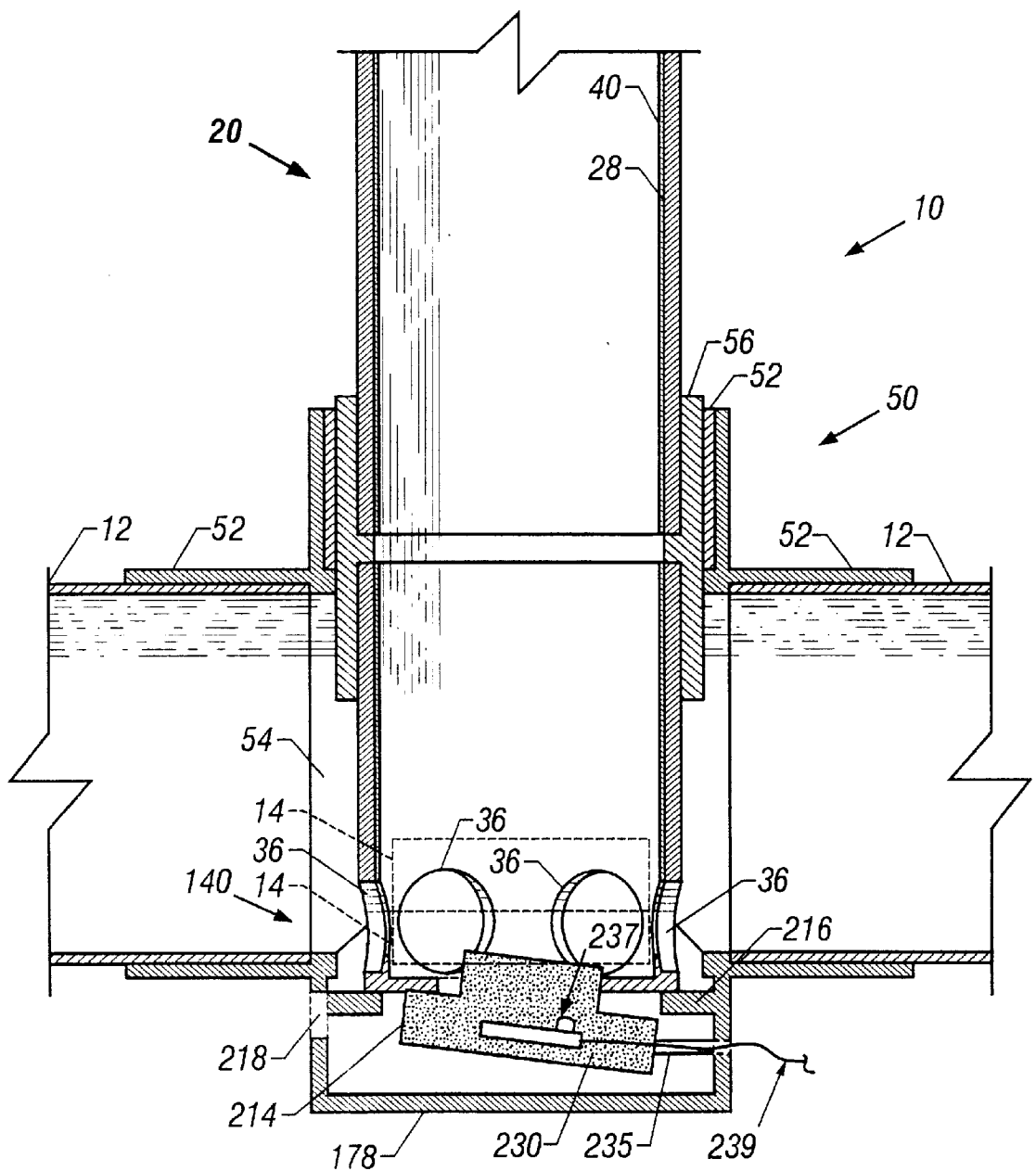
FIG. 10 is a cross-sectional view of the fourth alternate preferred embodiment showing the float sensor no longer held down due to the absence of a required weight of chlorine tablets.

A fourth alternate preferred embodiment is depicted in FIGS. 9 and 10. In this embodiment, push button 200 and support disk 210 are replaced by float 230 and float sensor 237. Float 230 floats in fluid in the interior of proximate base 178. Float 230 protrudes through cylinder floor aperture 216 of cylinder floor 216, thus supporting lowest chlorine tablet 14. When the weight of chlorine tablets 14 drops below a predetermined level (such as 0, 1 or 2 tablets left), float 230 floats upward, as depicted in FIG. 10. One side of float 230 is attached to a side of proximate base 178 by a support tube 235, which is a flexible tube (typically rubber). Support tube 235 is flexible enough to allow float to move, but is stiff enough to act as a pivot point for float 230 to rotate upward. Attached to float 230 (preferably interior to float 230) is float sensor 237. Float sensor 237, typically a mercury switch or like device, is capable of detecting rotational movement of float 230. When float 230 rotates upward, float sensor 237 sends a signal through sensor wire 239, typically located within support tube 235. The signal through sensor wire 239 is sent to an alarm, pump or other like device(s) as described in earlier embodiments. Water, or gray wastewater, falls through annular space 144, and flows out water relief hole 218. Water relief hole 218 is high enough to allow water to always be interior to proximate base 178 such that float 230 always has buoyancy.

In all embodiments described above, annular space 144 provides gray wastewater diversion such that gray wastewater does not contact chlorine tablets 14. Annular space 144 can likewise divert a portion of water being treated such that some of the water passes across chlorine tablets 14 by passing through cylinder portion openings 32 while the rest falls through annular space 144 an exits out relief hole 218 untreated. Alternatively, annular space 144 or similarly described features may be missing or plugged such that all water passes across chlorine tablets 14 through cylinder portion openings 32 or like described structures. In this embodiment (not shown), the amount of water to be treated is controlled by a by-pass valve controlling a parallel water line, wherein the main water line splits into a first stream and a second stream in separate pipes, the first stream flowing across the chlorine tablets 14, the rest second stream flowing through a by-pass line, and the two water streams rejoining downstream from chlorinator 10, mixing to a desired chlorine level in the treated water.

Chlorinator 10 can be used to turn off a pump in an aerobic wastewater treatment system. The set up of a typical aerobic waste treatment system includes a primary tank, a secondary tank, and a pump tank, each of which is at least partially below ground. A sewer line extends from a home to the primary tank. Process flow flowing within a sewer line is primarily or pre-treated in the primary tank. A secondary tank is in fluid communication through a continuation of the sewer line with the primary tank and includes an aerator means. The process flow that has exited the primary tank is aerobically treated within the secondary tank by an aerator means. A further continuation of the sewer line provides fluid communication between the secondary tank and the pump tank. The sewer line abruptly ends in a sewer line outlet within and near the top of the pump tank so that process flow flowing through the sewer line falls out of the sewer line outlet into the pump tank. A pump at the bottom of the pump tank is in fluid communication with a sprinkler line. When activated, the pump pumps the treated process flow stored within the pump tank into and through the sprinkler line. When chlorinator 10 is used in an aerobic wastewater treatment system such as described, push button sensor 181 further connects to circuitry (not shown) that turns off the pump in the pump tank, disabling the pumping mechanism.

In operation, assuming that chlorinator 10 is already properly connected to waste stream 12, cylinder portion first end 22 is situated above ground 16, and chlorine tablets 14 have not yet been inserted into cylinder portion 20, a user must first insert chlorine tablets 14 into cylinder portion 20 through cylinder portion first end 22. As each chlorine tablet 14 is inserted through cylinder portion first end 22, it descends by gravity down cylinder portion 20 towards cylinder portion second end 24. Due to the inclusion of coating 40 on cylinder portion inner surface 28, the chlorine tablets 14 simply slide on cylinder portion inner surface 28 and do not stick thereto.

The first chlorine tablet 14 inserted into cylinder portion 20 falls to cylinder portion second end 24 and comes to rest thereon. In addition, since it is resting on cylinder portion second end 24, the first chlorine tablet 14 also rests on the top end of prong 182, which protrudes into cylinder portion second end 24 through cylinder portion second end hole 183.

It is noted that when chlorine tablet 14 rests on prong 182, the weight of chlorine tablet 14 on prong 182 may cause pivot arm 190 to pivot at least a small amount backward, or vertically downwards. However, due to the inclusion of stop knob 187, prong 182 cannot pivot backward past the point at which prong 182 contacts stop knob 187. Once a sufficient number of chlorine tablets 14 are inserted in cylinder portion 20, chlorinator 10 is ready for normal use.

During normal use, waste stream 12 is not perpetually filled with waste. Instead, the flow of waste through waste stream 12 is in batches, with the occurrence of the batches being directly dependent on the activity within the house or building serviced by the waste stream 12. In other words, one batch of waste will flow through the waste stream 12 during the time a person is taking a shower or directly after a person has flushed a toilet. No batches of waste will flow when there is no relevant activity inside the house or building.

Importantly, the type of activity within the house or building also dictates the volume and flow rate of each batch. For instance, a toilet flush produces a batch of waste through waste stream 12 that has a very large volume and a very fast flow rate. On the other hand, the majority of other activities, including a person bathing or washing his/her hands, produces a batch of waste through waste stream 12 that has a relatively small volume and a relatively slow flow rate. Also importantly and as previously disclosed, the waste transported within waste stream 12 typically comprises septic wastewater as well as gray wastewater. Septic wastewater is defined as waste that originates from toilet systems and as a result of toilet flushes. Gray wastewater comprises all other wastes originating somewhere other than from toilet systems.

Putting the two concepts together then, toilet flushes generate batches of septic wastewater that have a very large volume and that have a very fast flow rate. On the other hand, most other activities generate batches of gray wastewater that have a relatively small volume and a relatively slow flow rate. Under current laws and regulations, only septic wastewater needs to be treated by chlorinator 10 and chlorine tablets 14.

Means for selectively treating 140 selectively treats the batches of septic wastewater which result from toilet flushing with the chlorine tablets 14 and selectively does not treat the batches of gray wastewater that result from most all other activities. In general, because batches of gray wastewater have a relatively small volume and a relatively slow flow rate (about ¼–½ gallon per minute), such gray wastewater "trickles" through the upstream side of waste stream 12 towards chlorinator 10. Not having much impulse, the wastewater then falls in the passageway 143, or annular space 144 in the preferred embodiment, instead of continuing through the cylinder portion openings 32. After flowing through the passageway 143, or annular space 144 in the preferred embodiment, the gray wastewater falls by gravity to the base portion 80. After reaching the base portion 80, the gray wastewater flows through the oversized holes 88 out of chlorinator 10 and drops into the pump tank that houses chlorinator 10. If the alternative embodiment using proximate base 178 is used, the gray wastewater flows through one or more openings of appropriate size (not shown) to allow the gray wastewater flow to drop into the pump tank that houses chlorinator 10.

On the other hand, because batches of septic wastewater have a large volume and a fast flow rate (about 1½–10 gallons per minute), such septic wastewater "barrels" through the upstream side of waste stream 12 towards chlorinator 10. Having a large quantity of impulse, the septic wastewater flows through the cylinder portion openings 32 and the majority of it continues on to the downstream side of waste stream 12, instead of falling in the passageway 143.

On average, only about 20% of the wastewater that flows through waste stream 12 comprises septic wastewater, with the remaining 80% comprising gray wastewater. Therefore, the means for selectively treating 140 in essence only treats 20% of the total wastewater that flows through waste stream 12. As previously stated, only septic wastewater, or 20% of the overall wastewater flow, needs to be treated by chlorine tablets 14. By being able to selectively treat only such 20% of the wastewater, chlorinator 10 greatly increases the life of the chlorine tablets 14 since such tablets 14 are not subjected to the remaining 80% of the wastewater flow.

The flow of the septic wastewater through the cylinder portion openings 32 and within the cylinder portion interior 30 is essentially a three dimensional flow. The flow enters cylinder portion 20 through the cylinder portion holes 36. Within cylinder portion interior 30, the flow of septic wastewater also falls into cylinder portion passages 34, or cylinder portion slits 38 in the preferred embodiment. A chlorine tablet 14 resting on cylinder portion second end 24 will therefore be surrounded by the flow of septic wastewater on all of its sides, including its underside which is adjacent the cylinder portion passages 34, or cylinder portion slits 38 in the preferred embodiment. The septic wastewater is treated by the chlorine tablets 14 as it contacts the chlorine tablets 14. Because the septic wastewater flow contacts all sides of at least the lowermost chlorine tablet 14, the rate and efficiency of treatment or chlorination is faster and better than if the septic wastewater flow would not contact all sides of at least the lowermost chlorine tablet 14 (as is the case in prior art chlorinators).

After contacting the chlorine tablets 14, the majority of the septic wastewater flow continues out of cylinder portion 20 through the cylinder portion holes 36 that are adjacent the downstream side of waste stream 12. Once out of the cylinder portion 20, the septic wastewater is now treated and chlorinated in accordance with the laws and regulations and continues through the downstream side of waste stream 12. Notably, the portion of septic wastewater that fell into cylinder portion passages 34 (or cylinder portion slits 38 in the preferred embodiment) falls by gravity to the base portion 80 and continues out of chlorinator 10 through oversized holes 88.

As more septic wastewater contacts the chlorine tablets 14, the chlorine tablets 14 become smaller, losing chlorine molecules during the chlorination process. With respect to the lowermost chlorine tablet 14, such chlorine tablet 14 remains supported by the top end of prong 182 even after it is smaller in cross-section than the cylinder portion second end hole 183. Therefore, by maintaining chlorine tablet 14 in contact with the septic wastewater flow, chlorinator 10 is able to extract all possible use of each chlorine tablet 14.

As the lowermost chlorine tablet 14 becomes smaller, the chlorine tablet 14 that is directly above it falls by gravity towards cylinder portion second end 24, eventually taking the place of the lowermost chlorine tablet 14. Due to the inclusion of coating 40 on cylinder portion inner surface 28, the chlorine tablets 14 simply slide on cylinder portion inner surface 28 and do not stick thereto. In addition, the sliding and non-stick action enabled by the coating 40 continues even after the chlorinator 10 has been in use for a substantial period of time. It is further noted that coating 40 does not react with the chlorine tablets 14; therefore, the chlorine tablets 14 retain their treatment properties even after time and substantial use.

Prong 182 is constructed to be semi-floatable so that it tends to float when wastewater surrounds it within base portion 80. When chlorine tablets 14 rest on the top end of prong 182, the weight of the tablets 14 acts to maintain the bottom end of prong 182 against stop knob 187 and prevents prong 182 from floating.

Once the last chlorine tablet 14 is dissolved, since there is no more weight acting upon prong 182, semi-floatable prong 182 floats up when wastewater enters base portion 80, causing pivoting arm 190 to pivot forward, or vertically upwards. Means for sensing 180 is constructed so that once prong 182 pivots past a certain, pre-determined point, prong 182 remains in its pivoted forward position, with stop arm 185 abutting base portion 80 thereby preventing any further forward pivoting motion. In other words, once prong 182 pivots past the certain, pre-determined point, prong 182 does not return to its original position abutting stop knob 187 even after the wastewater has exited chlorinator 10.

After prong 182 pivots forward past the certain, pre-determined point, sensor 188 senses this pivoting motion and transmits a signal to a user indicating that the last chlorine tablet 14 has dissolved. In the preferred embodiment, while the chlorinator 10 is functioning properly with chlorine tablets 14 therein, sensor 188 maintains a signal light "on" for the user. Once the last tablet 14 is dissolved, sensor 188 preferably turns such signal light "off". Therefore, when a user notices that the signal light is "off", the user knows that either the tablets 14 have been dissolved, the sensor 188 is malfunctioning, or the tablets 14 are not sliding properly within chlorinator 10.

In order to comply with the laws and regulations, the wastewater that passes through chlorinator 10 should have a chlorine per gallon content of approximately one. The chlorine content of the wastewater can be controlled to be within regulation by changing the size of the cylinder portion openings 32, including cylinder portion passages 34 and cylinder portion holes 36. It has been found through experimentation that the following combinations generally generate the appropriate chlorine per gallon content in the treated wastewater:

a.) for a daily wastewater volume of 250 gallons, cylinder portion holes 36 should be approximately 1¼" in diameter;

b.) for a daily wastewater volume of 500 gallons, cylinder portion holes 36 should be approximately 1" in diameter;

c.) for a daily wastewater volume of 750 gallons, cylinder portion holes 36 should be approximately ¾" in diameter; and d.) for a daily wastewater volume of 1000 gallons, cylinder portion holes 36 should be approximately ½" in diameter.

As previously disclosed, in the preferred embodiment, cylinder portion 20 is slidingly frictionally attached to its respective inlet 52. Thus, cylinder portion 20 can be removed from four way joint portion 50 simply by lifting it out of inlet 52. When ready to reattach cylinder portion 20, a user simply reinserts cylinder portion 20 within its respective inlet 52. Although at this point prong 182 may be pivoted forwards, or vertically upwards, stop arm 185 prevents it from pivoting past a certain point. Such mechanisms should be constructed so that, at the point stop arm 185 stops the pivoting motion of prong 182, cylinder portion 20 can be inserted within inlet 52 and prong 182 easily falls within cylinder portion second end hole 183.

While the operation of chlorinator 10 is described above for the specific use in a wastewater treatment system, chlorinator 10 is also useful in any system requiring chlorination of a moving liquid. A typical use for chlorinator 10 is a swimming pool chlorination system. Operation is analogous as described above except there is no means for selectively treating 140 as describe above for septic wastewater versus gray wastewater. Rather, all channeled water passes across chlorinator 10. If such water flow channeling is elected by design, this channeling (not shown) diverts a portion of the water required to dissolve chlorine tablets 14 at a predetermined rate, said portion re-mixing with the rest of the water stream to create a total water stream with the proper level of chlorination.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A chlorinator for aerobic waste treatment systems, comprising:

a cylinder portion adapted to hold a plurality of chlorine tablets therein;

said cylinder portion comprising a plurality of openings providing fluid communication between a waste stream and said plurality of chlorine tablets such that said waste stream comes in contact with surfaces of at least one of said plurality of chlorine tablets;

said cylinder portion further comprising a cylinder floor;

said cylinder floor comprising a floor aperture;

a support disk hinged and oriented over said floor aperture; and a means for sensing the presence of said chlorine tablets within said cylinder portion.

2. The chlorinator as in claim 1, further comprising:

said cylinder portion being slidably insertable into a joint portion;

said joint portion functionally attached to said cylinder portion and to said waste stream;

said joint portion including a central interior region; and said plurality of holes located within said central interior region when said cylinder portion is functionally attached to said joint portion.

3. The chlorinator as in claim 2, further comprising:

a proximate base portion;

said joint portion including four inlets;

each of said four inlets leading to said central interior region;

said four inlets comprising two sets of opposing inlets;

said cylinder portion and said base portion functionally attached to two of said opposing inlets; and said waste stream in fluid communication with the remaining two of said opposing inlets.

4. The chlorinator as in claim 3, further comprising a passageway providing fluid communication between the upstream side of said waste stream and said base portion without directing any of the relevant fluid through said cylinder portion.

5. The chlorinator as in claim 4, wherein:

said cylinder portion having an outer cross-sectional diameter;

said joint portion including an inlet;

said inlet having an inner cross-sectional diameter;

said cylinder portion outer cross-sectional diameter at said cylinder portion second end being smaller than said inlet inner cross-sectional diameter thereby defining an annular space therebetween; and said passageway comprising said annular space.

6. The chlorinator as in claim 1, wherein:

said means for sensing comprising a push button sensor;

said push button sensor attached to said proximate base portion;

said push button sensor oriented below and proximate said support disk;

said push button and said support disk supporting said chlorine tablets; and said sensor sensing when a weight of said chlorine tablets has dropped below a pre-determined value.

7. The chlorinator as in claim 6, wherein:

said means for sensing adapted to activate a low chlorine alarm when said weight of said chlorine tablets has dropped below said pre-determined value.

8. The chlorinator as in claim 6, wherein:

said means for sensing adapted to deactivate a pump in a pump tank of said aerobic waste treatment system when said weight of said chlorine tablets has dropped below said pre-determined value.

9. A chlorinator for water treatment systems, comprising:

a cylinder portion adapted to hold a plurality of chlorine tablets therein;

said cylinder portion comprising a plurality of openings providing fluid communication between a water stream and said plurality of chlorine tablets such that said water stream comes in contact with surfaces of at least one of said plurality of chlorine tablets;

said cylinder portion further comprising a cylinder floor;

said cylinder floor comprising a floor aperture;

a support disk hinged and oriented over said floor aperture; and a means for sensing the presence of said chlorine tablets within said cylinder portion.

10. The chlorinator as in claim 9, further comprising:

said cylinder portion being slidably insertable to a joint portion;

said joint portion functionally attached to said cylinder portion and to said water stream;

said joint portion including a central interior region; and said plurality of holes located within said central interior region when said cylinder portion is functionally attached to said joint portion.

11. The chlorinator as in claim 10, further comprising:

a proximate base portion;

said joint portion including four inlets;

each of said four inlets leading to said central interior region;

said four inlets comprising two sets of opposing inlets;

said cylinder portion and said base portion functionally attached to two of said opposing inlets; and said water stream in fluid communication with the remaining two of said opposing inlets.

12. The chlorinator as in claim 11, further comprising a passageway providing fluid communication between the upstream side of said water stream and said base portion for directing said water stream through said cylinder portion.

13. The chlorinator as in claim 12, wherein:

said cylinder portion having an outer cross-sectional diameter;

said joint portion including an inlet;

said inlet having an inner cross-sectional diameter;

said cylinder portion outer cross-sectional diameter at said cylinder portion second end being smaller than said inlet inner cross-sectional diameter thereby defining an annular space therebetween; and said passageway comprising said annular space.

14. The chlorinator as in claim 9, wherein:

said means for sensing comprising a push button sensor;

said push button sensor attached to said proximate base portion;

said push button and said support disk supporting said chlorine tablets; and said sensor sensing when a weight of said chlorine tablets has dropped below a pre-determined value.

15. The chlorinator as in claim 14, wherein:

said means for sensing adapted to activate a local low chlorine alarm when said weight of said chlorine tablets has dropped below said pre-determined value.

16. The chlorinator as in claim 14, wherein:

said means for sensing adapted to activate a remote low chlorine alarm when said weight of said chlorine tablets has dropped below said pre-determined value.

17. The chlorinator as in claim 9, wherein said water treatment system being adapted for use with a swimming pool.

18. A chlorinator for water treatment systems, comprising:

a cylinder portion adapted to hold a plurality of chlorine tablets therein;

said cylinder portion being sliably insertable into a joint to a joint portion;

said joint portion functionally attached to said cylinder portion and to a fluid stream;

said joint portion including a central interior region;

said cylinder portion comprising a plurality of openings providing fluid communication between said fluid stream and said plurality of chlorine tablets such that said fluid stream comes in contact with surfaces of at least one of said plurality of chlorine tablets;

said cylinder portion further comprising a cylinder floor;

said cylinder floor comprising a floor aperture;

a float oriented below and through said floor aperture; and a means for sensing the presence of said chlorine tablets within said cylinder portion.

19. The chlorinator as in claim 18, further comprising:

said means for sensing comprising a float sensor functionally attached to said float;

said float sensor producing a signal when said float floats upward as a weight of said chlorine tablets drops below a pre-determined value.

20. The chlorinator as in claim 19, wherein said means for sensing adapted to activate a low chlorine alarm when said weight of said chlorine tablets has dropped below said pre determined value.

21. The chlorinator as in claim 19, wherein said means for sensing adapted to deactivate a pump in a pump tank of an aerobic waste treatment system when weight of said chlorine tablets has dropped below said pre-determined value.

22. The chlorinator as in claim 18, further comprising a means of selectively directing said fluid stream through and around said cylinder portion holding said chlorine tablets.

* * * * *